United States Patent [19]

Hisano

[11] Patent Number: 5,239,616
[45] Date of Patent: Aug. 24, 1993

[54] PORTABLE FUZZY REASONING DEVICE

[75] Inventor: Atsushi Hisano, Nagaokakyo, Japan

[73] Assignee: Omron Corporation, Kyoto, Japan

[21] Appl. No.: 789,540

[22] Filed: Nov. 8, 1991

Related U.S. Application Data

[63] Continuation of Ser. No. 509,152, Apr. 16, 1990, abandoned.

[30] Foreign Application Priority Data

Apr. 14, 1989 [JP] Japan .................................. 1-95862

[51] Int. Cl.⁵ .............................................. G06F 7/38
[52] U.S. Cl. ........................................ 395/3; 395/900; 395/61; 364/807
[58] Field of Search ................... 395/61, 3, 900; 364/807

[56] References Cited

U.S. PATENT DOCUMENTS

| | | | |
|---|---|---|---|
| 4,864,490 | 9/1989 | Nomoto et al. | 364/157 |
| 4,875,184 | 8/1989 | Yamakawa | 307/210 |
| 4,881,505 | 11/1989 | Tomisawa | 123/480 |
| 4,903,192 | 2/1990 | Saito et al. | 364/157 |
| 4,918,620 | 4/1990 | Ulug | 364/513 |
| 4,926,826 | 5/1990 | Nakaniwa et al. | 123/489 |
| 4,930,084 | 5/1990 | Hosaka et al. | 364/424.01 |
| 4,961,225 | 10/1990 | Hisano | 364/513 |
| 4,966,118 | 10/1990 | Itakura et al. | 123/492 |
| 5,001,640 | 3/1991 | Matsumoto et al. | 364/426.01 |
| 5,073,863 | 12/1991 | Zhang | 364/715.01 |

OTHER PUBLICATIONS

"A Fuzzy Knowledge-Based System Shell" Leung et al, preceedings TENCON, 1987 IEEE, vol. 2 of 3, Aug. 25-28, 1987.

"Architectures for Custom VLSI Processor Based Embedded Fuzzy Expert Systems", Corder et al. 3rd IFSA Congress, Aug. 6-11, 1989.

"A Fuzzy representation for event ocurrence", Overton et al., APIE vol. 1198 Sensor Fusion II:Human and Machine Strategies (1989).

*Primary Examiner*—Allen R. MacDonald
*Assistant Examiner*—George Davis
*Attorney, Agent, or Firm*—Dickstein, Shapiro & Morin

[57] ABSTRACT

A sensory inspection device according to this invention comprises a keyboard for inputting an evaluation value with respect to a plurality of variables, a fuzzy reading unit for outputting a final evaluation by performing fuzzy reasoning according to the evaluated value input through the keyboard, and a displaying unit for displaying the final evaluation output from the fuzzy reasoning unit. The fuzzy reading unit reads data such as fuzzy rules and membership functions that are stored either on an integrated circuit card or on an optical card. Finally, the entire device is portable and small enough to be held in one hand.

7 Claims, 8 Drawing Sheets

| 1 Color | 1 - 10 |
| 2 Size | 1 - 10 |
| 3 Hardness | 1 - 10 |
| ⋮ | |
| M Flaws | 1 - 10 |

FIG. 4

| $V_{11}$ | $L_{11}$ | $V_{12}$ | $L_{12}$ | $V_{13}$ | $L_{13}$ | ---- | $V_{1M}$ | $L_{1M}$ | $Y_1$ |
|---|---|---|---|---|---|---|---|---|---|
| $V_{21}$ | $L_{21}$ | $V_{22}$ | $L_{22}$ | $V_{23}$ | $L_{23}$ | ---- | $V_{2M}$ | $L_{2M}$ | $Y_2$ |
| $V_{31}$ | $L_{31}$ | $V_{32}$ | $L_{32}$ | $V_{33}$ | $L_{33}$ | ---- | $V_{3M}$ | $L_{3M}$ | $Y_3$ |
| ⋮ | ⋮ | ⋮ | ⋮ | ⋮ | ⋮ | | ⋮ | ⋮ | ⋮ |
| $V_{N1}$ | $L_{N1}$ | $V_{N2}$ | $L_{N2}$ | $V_{N3}$ | $L_{N3}$ | ---- | $V_{NM}$ | $L_{NM}$ | $Y_N$ |

PORTABLE FUZZY REASONING DEVICE

This application is a continuation of application Ser. No. 07/509,152 filed Apr. 16, 1990, now abandoned.

BACKGROUND

1. Field of the Invention

This invention relates to a fuzzy reasoning device. More specifically, this invention relates to an apparatus utilizing membership functions, the roots of fuzzy logic that were developed by Lofti Zadeh circa 1965, to evaluate an object or a process. A membership function represents a set with indistinct boundaries, hence the term "fuzzy". Fuzzy sets differ from crisp, Boolean type logic in that, as opposed to the latter, a fuzzy set allows for shades of grey. Accordingly, each element of a membership function is given a grade which is a percentage of how definitely the element fits into the fuzzy set.

For example, a membership function representing an average workweek for a businessman might produce a grade of 100%, or 1, for a variable value of 40 hours, a grade of 0.6 for a variable value of either 35 or 44 hours, and a grade of 0.1 for a variable value of either 53 or 20 hours. In this fuzzy set, a businessman who worked more than 53 or less than 20 hours a week would have a 0% membership in the membership function and, on the basis of the fuzzy rule defining the membership function, would be said not to have an average workweek.

As can be seen, fuzzy logic represents human logic much more closely than traditional Boolean logic, which, in the above example, would determined that someone who worked 20 hours a week had an average workweek while someone who worked 19 hours a week did not. Furthermore, just as a human makes numerous, unconscious fuzzy type calculations for each decision, a fuzzy reasoning machine can apply many differing fuzzy rules to arrive at one specific determination. The avove example only had one fuzzy rule comprised of one term, an average workweek. More complex problems require application of a plurality of fuzzy rules, each comprised of a plurality of fuzzy terms. A fuzzy rule is expressed in the following form:

If $(x1=A$ and $x2=B\ldots)$ then $(y=z)$

The "If" clause is called the antecedent and the "then" clause is called the consequent. Furthermore, each "x" represents an input variable and "y" represents an output variable. Each capital letter represents a fuzzy label which can be represented by a membership function. Finally, each "=" pairing, for example $(x1=A)$, represents a fuzzy term which can be applied to a specific part of a graph of a membership function.

FIG. 8 shows how membership functions for each variable can be logically combined to produce an output membership function for a fuzzy rule and, moreover, how to combine fuzzy rule output membership functions to achieve one defuzzified result. As can be seen, FIGS. 8(A) and 8(B) represent membership functions wherein x1 and x2, the horizontal axis, indicate variables and A and B are membership functions representing fuzzy labels. Furthermore, the vertical axis value at the point of intersection of the fuzzy label membership function and the variable values, $x1'$ and $x2'$, represents a grade of membership. Thus, in FIG. 8(A), 0.5 represents the first term's grade in the antecedent of the first rule. In FIG. 8(B), 0.3 represents the second term's grade in the antecedent of the first rule.

Figure 8A:
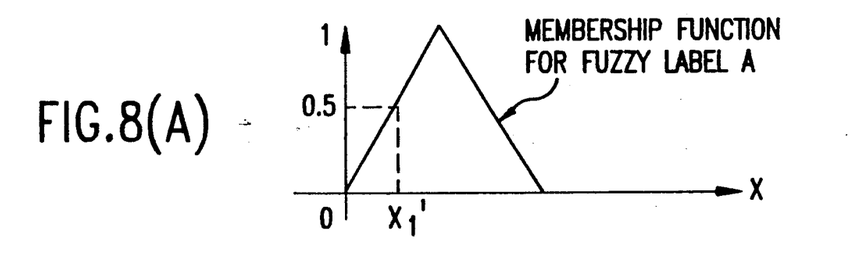
FIGS. 8(A), 8(B), 8(C) and 8(D) show membership functions explaining the fuzzy reasoning process.
Figure 8B:
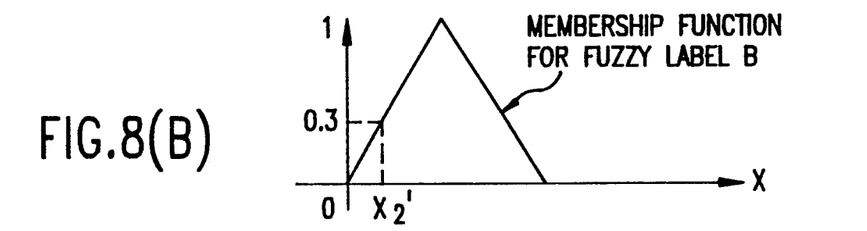
Figure 8C:
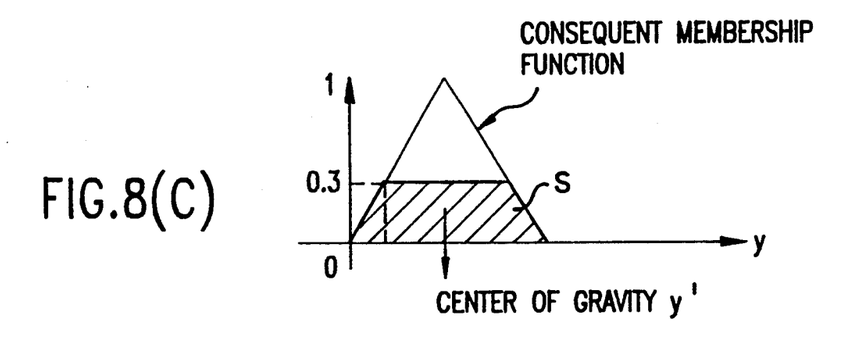

FIG. 8(C) illustrates the manner in which the antecedent terms are combined to form the consequent. Since the antecedent terms are connected by an "and", their combined graph must be an intersection of the two. This process is referred to as a minimum function corresponding to a mini/max rule. When combining "or"s as in combining consequents, a maximum function applies and the result will not be an intersection of the membership functions. Since the mini rule applies in FIG. 8(C), the output membership function is truncated at the minimum membership grade value, 0.3, of the two input functions. The mesa, indicated by "S", is the consequent and represents all the membership grade values of the variables common to both antecedent terms. Furthermore, $y'$ is located at the center of gravity of the shaded mesa "S" and indicates the final inference determined by the fuzzy rule. In this case, there are only two terms in the antecedent. However, when more terms comprise an antecedent, the combination process is the same.

Figure 8D:
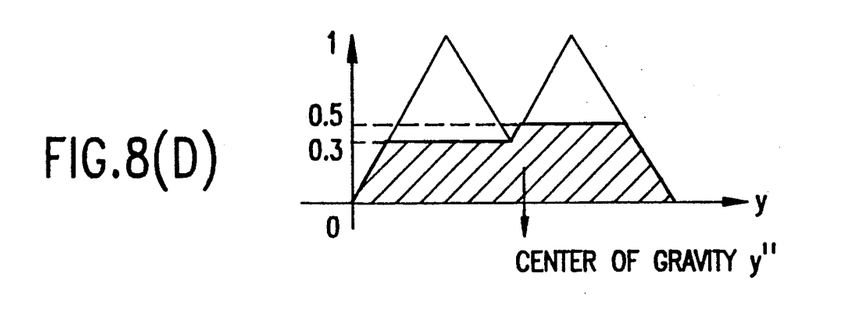

When, as is usually the case, more than one rule applies to a problem, the above-described process is used to determine the result for each fuzzy rule. However, as shown in FIG. 8(D), each result is not minimized as in the case of combining antecedent terms connected by "and"s but maximized because rules are theoretically connected by "or"s; they are different rules concerning the same phenomenon. Thus, in FIG. 8(D), two mesa portions from two rules are combined according to the max rule and the combined center of gravity is obtained at point $y''$, and the final result of the problem is obtained.

2. Related Art

Conventionally, there are sensory inspection devices for evaluating an object on behalf of a human. One of such conventional devices is unpublished Japanese Publication #61-23966. In this device, sounds are recorded by a microphone and compared with a pre-stored sound wavelength or frequency level. Using this device, an operator can create a sound and gain previously unattainable information about an object. For example, an operator could strike the side of a pumpkin and the apparatus would compare the sound with stored sounds of pumpkins being struck and issue a determination regarding the quality of the fruit.

However, this device has several drawbacks. First, the basis of comparison can only be made if a sound exactly apparatus, the comparison can only be made if a sound exactly corresponds to a prerecorded sound. Similarly, a standard of evaluation may vary from time to time. For instance, one person may want a pumpkin to make a jack-o-lantern while another may desire to make a pumpkin pie. In sum, the importance of a plurality of evaluation values are not constant. Finally, not only is the device limited by relying solely on stored standard patterns, but also such patterns are difficult to change as the expert himself must alter the frequency levels.

SUMMARY OF THE INVENTION

In view of the above-mentioned problems with the prior art, it is an object of this invention to provide a sensory inspection device capable of giving an evaluation based on subjective standards. This objective is accomplished by applying input data comprising a variety of variables to stored fuzzy rules, wherein the resulting evaluation made by the apparatus is an example of fuzzy reasoning.

Another object of this invention is to make it easy to change the subjective standards of sensory inspection. Therefore, the fuzzy rules are stored on a card, in which a computer can change information imprinted thereon by utilizing a card reader/writer.

Yet another object of this invention is to provide a sensory inspection apparatus that is portable. To avoid reliance upon an electrical outlet, the apparatus is provided with a battery unit as its own power source. Additionally, the apparatus is small enough to be conveniently moved to different locations.

Thus, a sensory inspection device according to this invention comprises a keyboard for inputting an evaluation value with respect to a plurality of variables, a fuzzy reasoning unit for outputting a final evaluation by performing fuzzy reasoning according to the evaluated value input through the keyboard, and a display for displaying the final evaluation output from the fuzzy reasoning unit. Furthermore, the sensory inspection device is portable and convenient because it is powered by a battery and small enough to be held in one hand while the other hand is left free to operate the keyboard.

Other objects and advantages of this invention will become apparent from the following description and accompanying drawings.

DESCRIPTION OF THE PREFERRED EMBODIMENT

Figure 1:
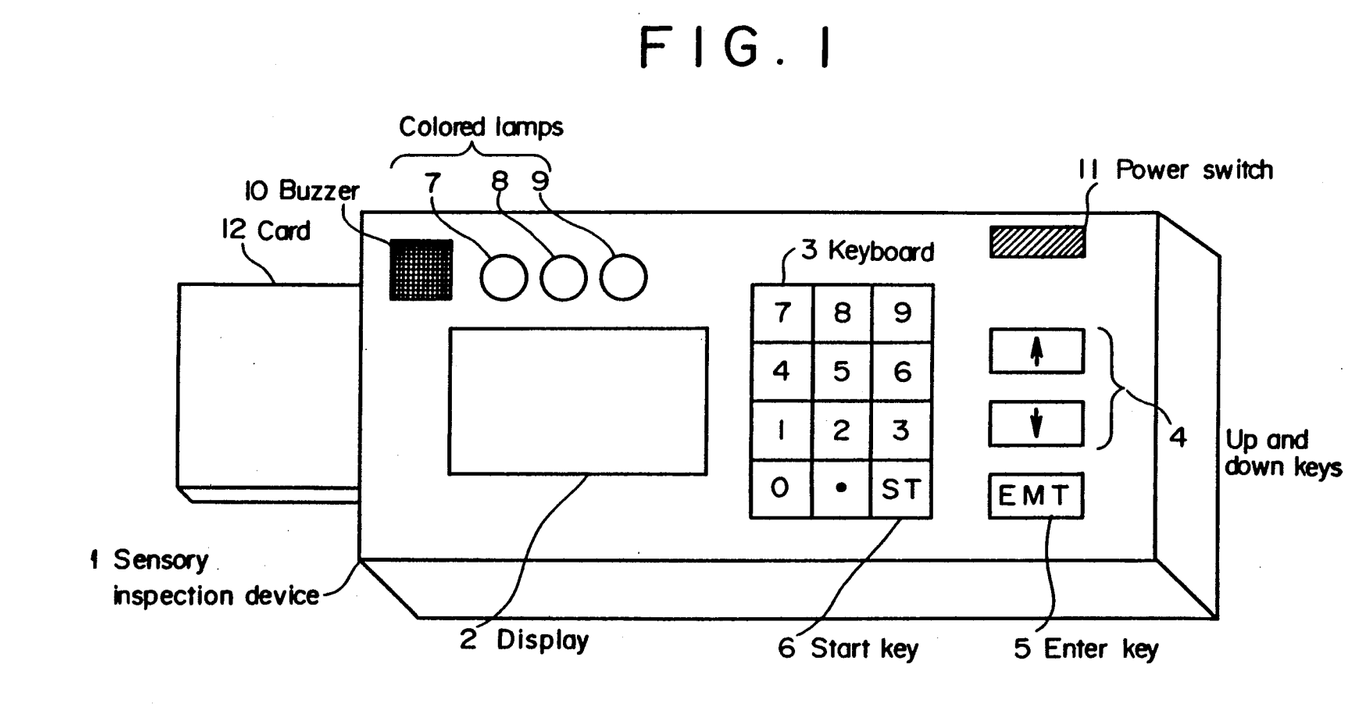
FIG. 1 represents the appearance of an embodiment of the sensory inspection device according to this invention.

FIG. 1 is an approximately actual size representation of a sensory inspection device 1 according to this invention. Accordingly, the small size of the fuzzy reasoning device enables it to be portable. To operate the sensory inspection device 1, an operator turns on a power switch 11 and inserts a card 12 containing stored fuzzy variables and fuzzy rules into the apparatus. The card 12 could be an integrated circuit card or an optical card. A display 2 is provided to display various requests to the operator, variable values input by the operator, final evaluations, and the like. A keyboard 3 is provided for the operator to input evaluation values for variables when he is instructed to do so by the display 2. Furthermore, up and down keys 4 are provided as part of the keyboard 3 to enable the operator to choose which variable appears on the display 2 so he can set the variable's value. These up and down keys 4 enable the operator to, for example, skip giving a value to a variable or to change a variable value without being bound to make a decision due to a predetermined order of a program.

Once the operator has decided on a variable value, a number value between 1 and 10, he depresses the corresponding keys on the keyboard 3 and then additionally strikes an enter key 5 to set the value in the inspection device's 1 memory. Once all the variable values have been set to the operator's satisfaction, he depresses a processing start key 6, also located on the keyboard 3, in order to initiate fuzzy reasoning.

When the sensory inspection device 1 processes the entered variable values by applying the fuzzy rules stored in the optical or integrated circuit card 12, the result can be displayed on the display 2. Assisting in indicating the result of the inspection, are colored lamps 7, 8, and 9 and buzzer 10. If lamp 7 turns on and emits, for example, a red color, then a good inspection score would be indicated. Similarly, if the second lamp 8 is lit, emitting, for example a yellow light, then a fair score is indicated. Finally, the last lamp 9 may be blue and indicates a poor score when lit. Additionally, a poor inspection score also triggers the buzzer 10 to buzz, doubly calling the operator's attention to a poor result. However, a sensory inspection device 1 according to this invention is not limited to having only three lamps of any particular color or only one buzzer. For example, a bell could be incorporated indicating a good result and many other indicating embodiments are covered by the scope of this invention.

Figure 2:
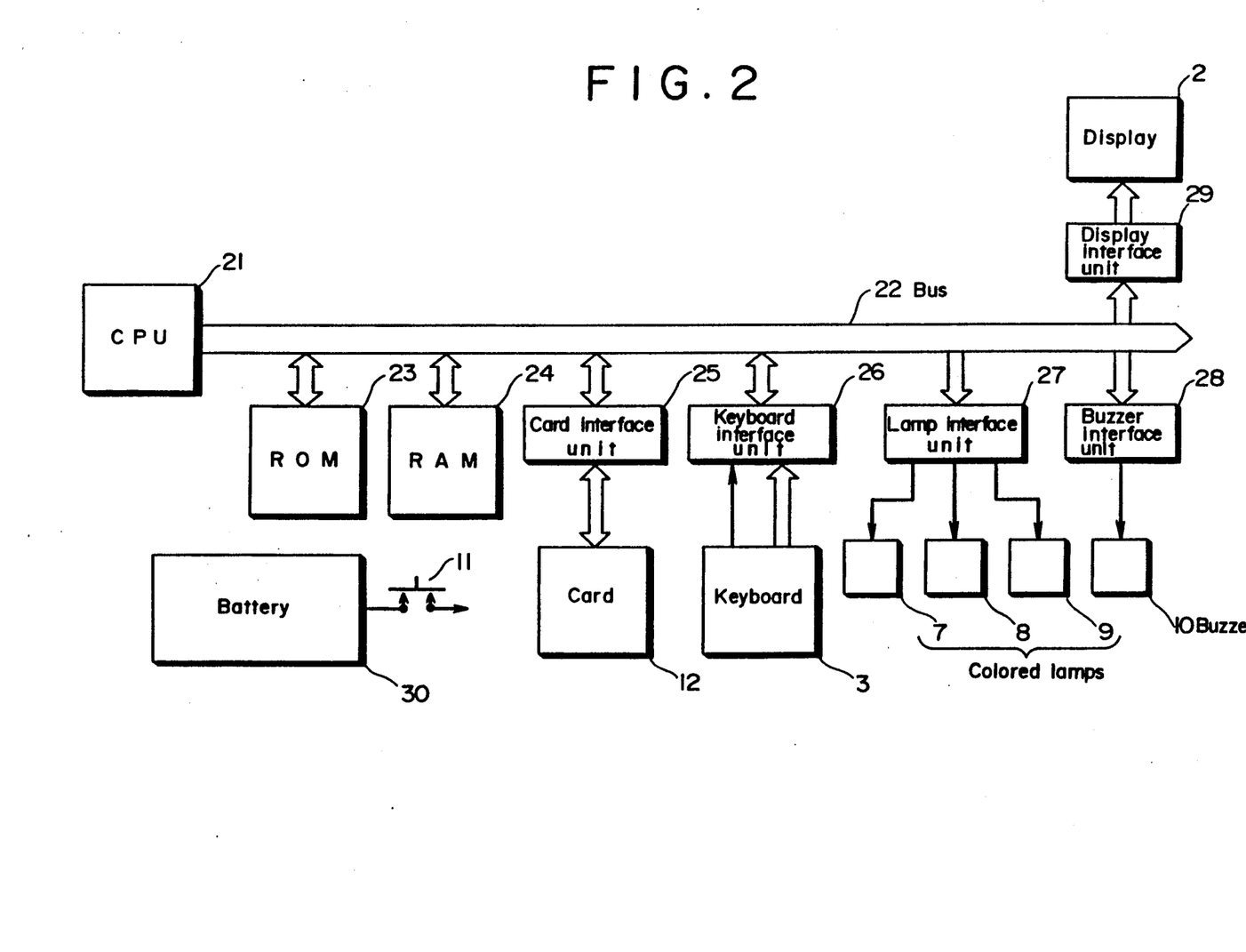
FIG. 2 is a block diagram of the sensory inspection device depicted in FIG. 1.

The block diagram which is FIG. 2 will enable one skilled in the art to more fully comprehend the construction of the sensory inspection device 1 in FIG. 1. Thus, the power switch 11 is connected to a battery 30 which supplies electrical power to the apparatus, enabling portability. Additionally provided in a CPU 21 which is connected to a ROM 23, a RAM 24, and all the parts in FIG. 1 via a bus 22 and various interface units.

The CPU 21 processes data and controls operation of all the respective parts. The sensory inspection device's 1 program is stored in the ROM 23. Entered variable values are stored in the RAM 24. The card 12 is connected to the bus 22 by a card interface unit 25. The keyboard 3, containing the numbered keys, up and down keys 4, enter key 5, and processing start key 6, is connected to the bus 22 by a keyboard interface unit 26. Colored lamps 7, 8, and 9 are controllably turned on and off by the CPU 21 via the bus 22 and a lamp interface unit 27. The buzzer 10 is connected to the bus 22 by a buzzer interface unit 28. And finally, the display 2 is controlled by the CPU 21 via the bus 22 and a display interface unit 29.

Figure 3:
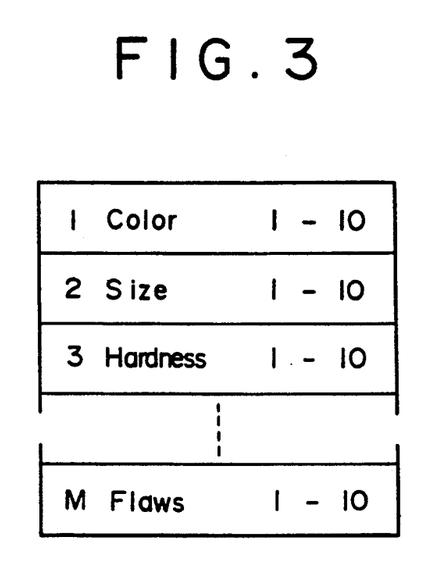
FIG. 3 is a table illustrating fuzzy variables used for evaluating an apple.
Figure 4:
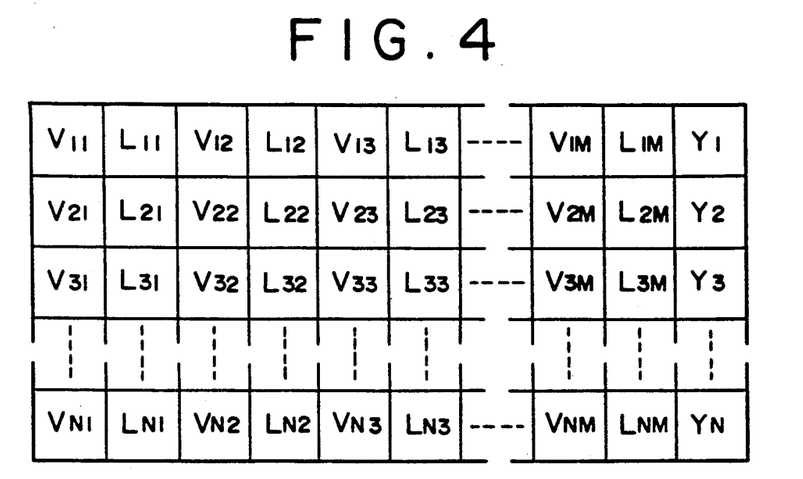
FIG. 4 is a table representing fuzzy rules used for fuzzy reasoning.
Figure 5:
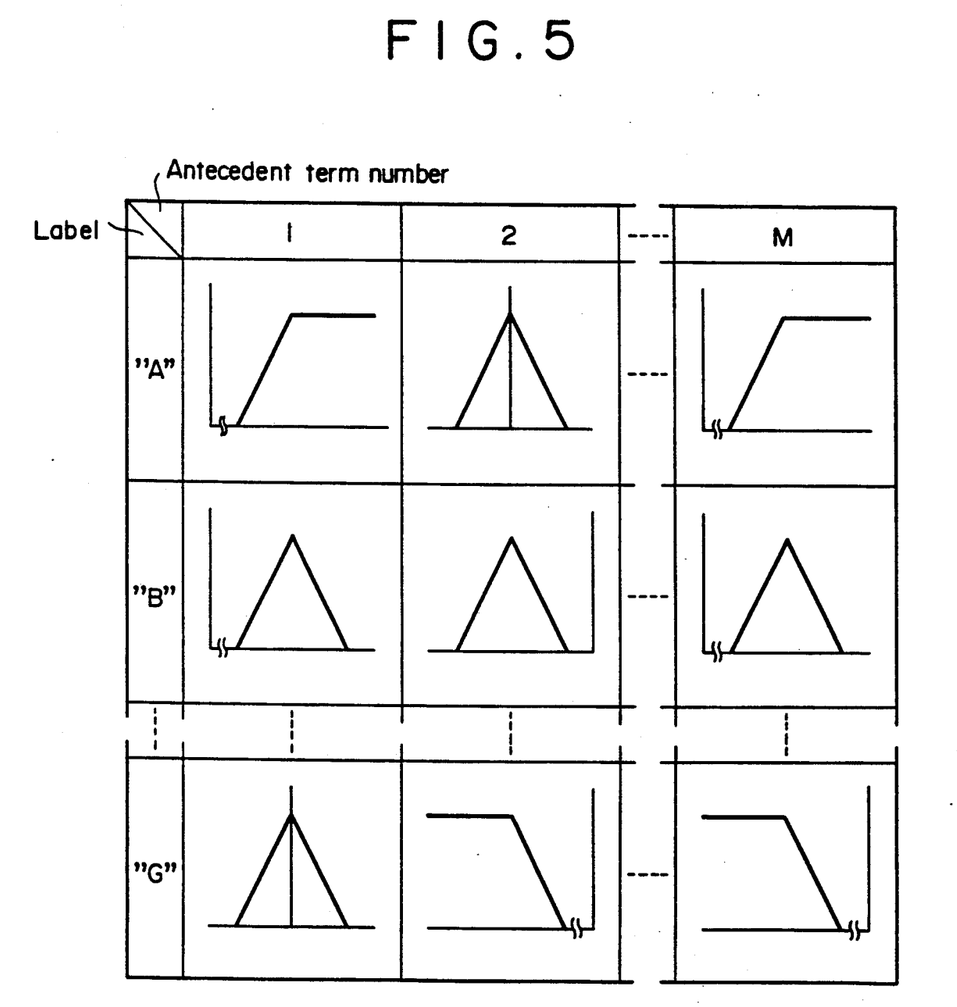
FIG. 5 illustrates examples of input membership functions.
Figure 6:
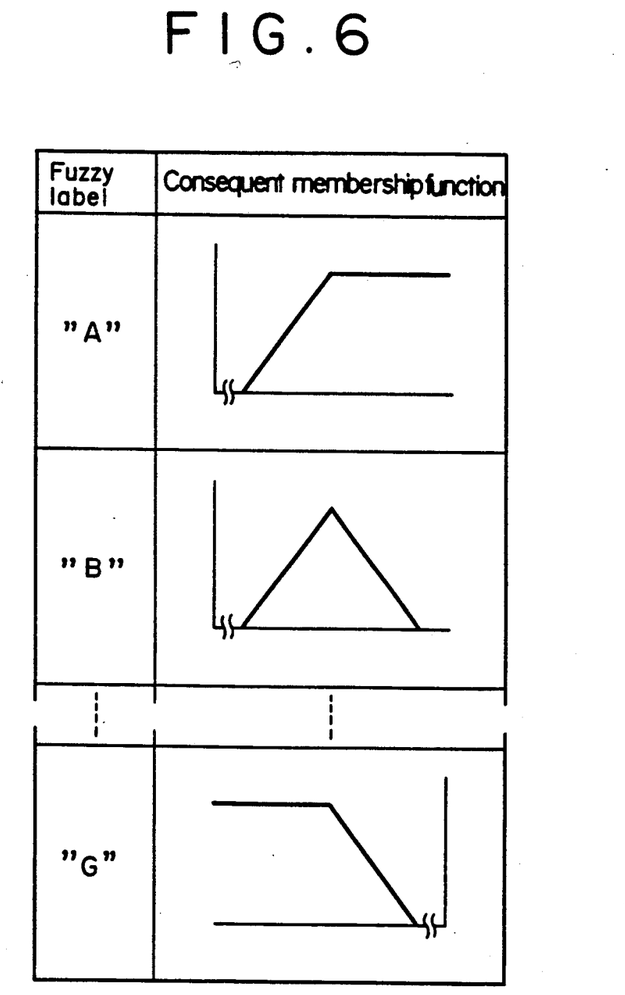
FIG. 6 illustrates examples of output membership functions.

FIGS. 3–6 represent data stored on each optical or integrated circuit card 12. More specifically, FIG. 3 is an example of a table of fuzzy variables for evaluating an apple. FIG. 4 exemplifies a table of fuzzy rules, each rule comprising variables to be applied to fuzzy values. Additionally, FIG. 5 illustrates examples of possible input membership functions used for fuzzy reasoning while FIG. 6 shows examples of output membership functions; functions that are a sum of all the input membership functions and are used for issuing a defuzzified evaluation.

Turning to FIG. 3, a number of variables 1, 2, 3, . . . , M are stored in the form of questions or prompts on an integrated circuit card 12 which is programmed to evaluate an apple. Furthermore, when an operator answers each prompt, which is displayed on the display 2, by entering a value of 1-10 and then depressing the enter key 5 on the keyboard 3, he sets a fuzzy variable value. The operator knows which number to enter because the fuzzy variable values corresponding to the numbers 1-10 are displayed on the display 2.

For example, the first variable regards the color of an apple. Assuming this integrated circuit card 12 is programmed for McIntosh apple inspection, numerical values 1-10 might represent fuzzy variable values wherein number 10 constituted a bright red apple. On the other hand, number 1 might represent an overripe brown apple, number 2 might represent a fuzzy variable value of a green, immature apple, and so forth. After the operator inputs the first fuzzy value for the first fuzzy variable, the second fuzzy variable will appear on the display 2 and the operator will repeat the process until all variable values have been set and he depresses the processing start key 6. In this case, the second variable regards the size of the apple, the third regards the hardness, and so forth until the final variable M, regarding flaws, for example: bruises, worm holes, and the like, appears on the display. In cases involving complex evaluations, M could feasibly be the 50th variable.

Once all the fuzzy variable values have been set, the sensory inspection device 1 is ready to apply the values to the fuzzy rules illustrated in FIG. 4. FIG. 4 is a table of fuzzy rules corresponding to fuzzy labels [L] (1, 2, 3, ..., N) each comprised of fuzzy variables [V] (1, 2, 3, ..., M), wherein a fuzzy label value can determine a membership grade ([1−N] [1−M]) for a fuzzy variable value. As an example, the first fuzzy rule is stored in the form of:

If (V11=L11 and V12=L12 and V13=L13 ... and V1M=L1M) then W=Y1

An output fuzzy label Y is determined for the output fuzzy variable W on the basis of the input values of the antecedent. Once the output fuzzy label Y has been determined for each fuzzy rule 1 to N, the rules can be applied to each other to achieve a final defuzzified evaluation by the sensory inspection device 1.

Figure 7A:
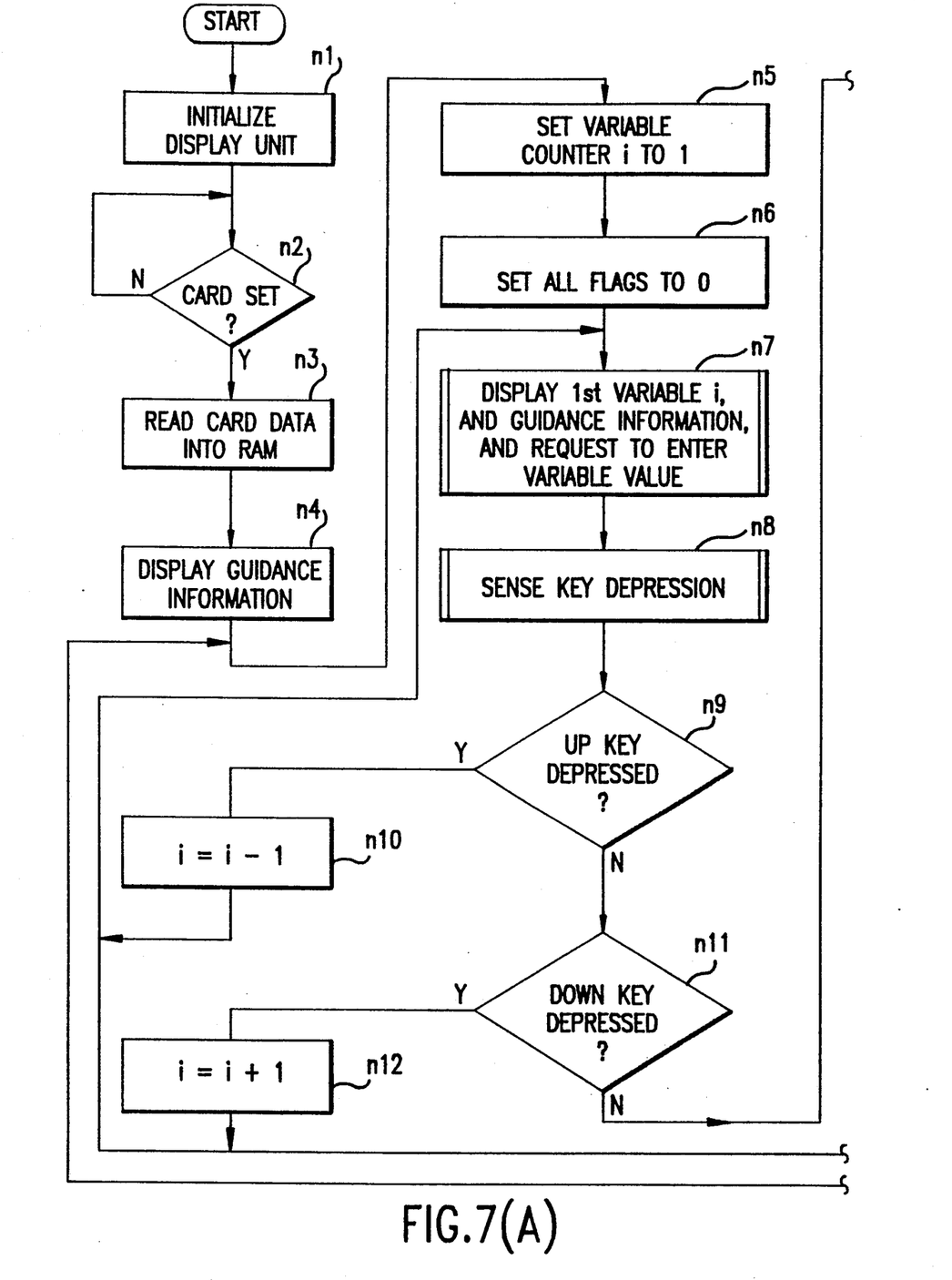
FIGS. 7(A) and 7(B) show a flow chart illustrating operation of a sensory inspection device according to this invention.
Figure 7B:
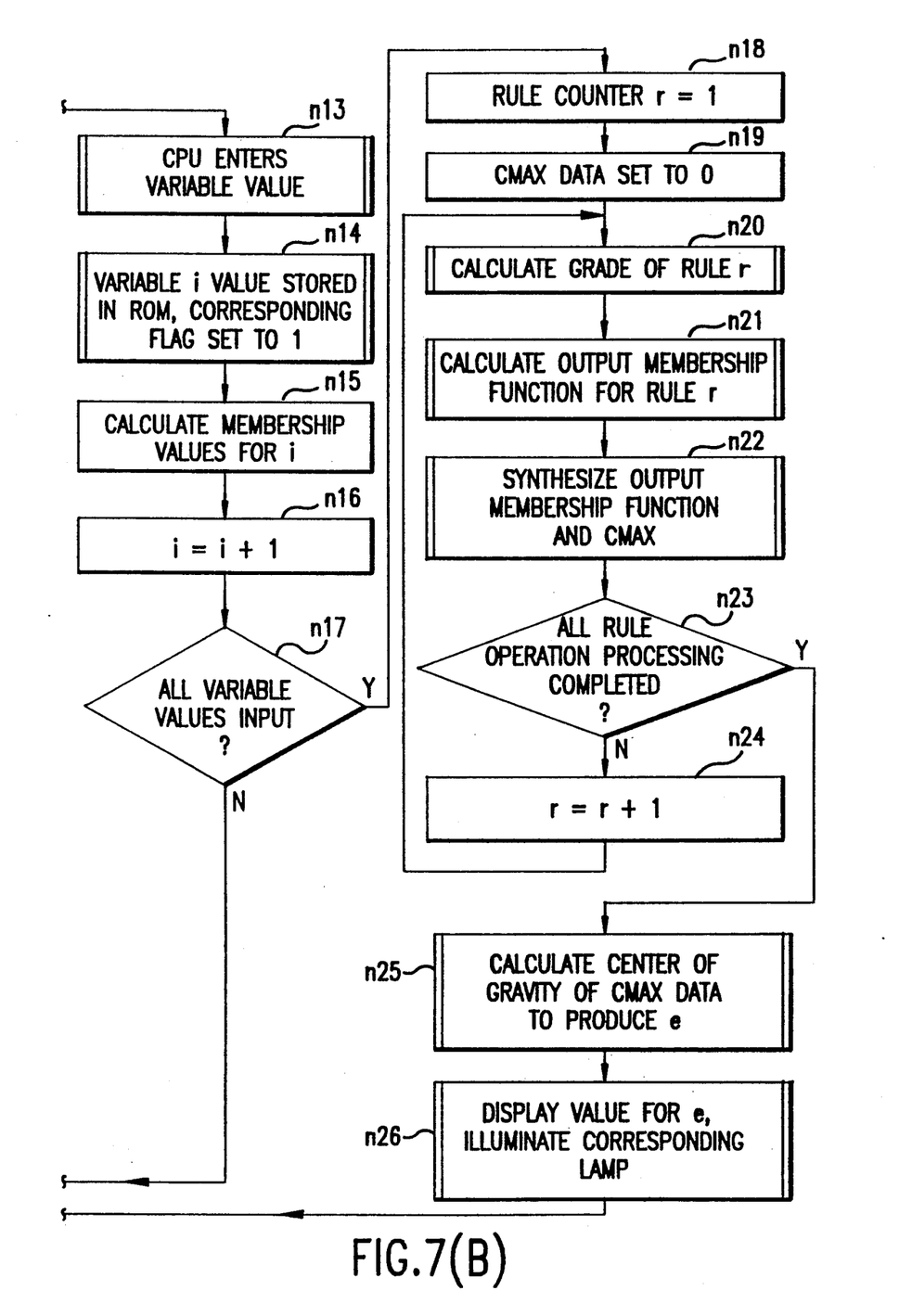

FIG. 5 illustrates a variety of input membership functions used to calculate output membership functions shown in FIG. 6. The number of input membership functions is equal to the number of variables (1 to M) in the antecedents of all the rules corresponding to fuzzy labels (1 to N). Assuming, as in FIGS. 5 and 6, there are 7 rules corresponding to fuzzy labels (A, B, ..., G) each comprised of M terms, the number of input membership functions is determined by multiplying 7 times M. Note that while membership functions are usually curved, they are represented as linear functions approximately curves to simplify the computer hardware. Also noteworthy is the fact that some membership functions have negative values or both negative and positive values, as can be seen by the functions' relation to the y-axis. After the membership grades have been calculated for each term, the consequent membership functions shown in FIG. 6 can be calculated. Finally, these consequent membership functions can be used to output a defuzzified determination to a problem. FIGS. 7A and 7B show is a flow chart explaining operation of the sensory inspection device 1. When an operator turns on the power switch 11, the operation is ready to start. First, the display unit is initialized to clear the display 2 (n1). Then, (n2) the CPU 21 inquires whether the card 12 is properly set in the apparatus. If the card 12 is not yet set, then the CPU 21 waits for the card 12. when the CPU 21 finally determines that the card 12 has been entered into the apparatus, the CPU 21 reads card data through the card interface unit 25 and into the RAM 24 for storage (n3). Next, guidance information is displayed through the display window 2, in forming the operator what is to be inspected (n4).

At this point, the sensory inspection device 1 readies itself to begin fuzzy reasoning. First, a variable counter (i) is set to 1 (n5). Next, all flags, binary numbers indicating if a variable value is set (1) or not (0), are set to 0 (n6). Then, the first variable i is shown on the display 2 along with guidance information regarding the meaning of variable values and requesting the operator to enter one of the variable values (n7). At this point, the operator uses the keyboard 3 to either enter a variable value or, if desired, change the display 2 to show another variable. Once the operator uses the keyboard, the CPU senses the key depression (n8). If the CPU 21 determines that the operator depressed the up key 4 (n9), then the variable counter is changed from i to i−1 (n10) and the program returns to n5, enabling the operator to review or change a variable value. Similarly, if the CPU 21 determines that the down key 4 was used, then the variable counter is changed from i to i+1 (n12) and the program is returned to n5, enabling the operator to skip a variable.

Usually, however, these up and down keys 4 are not used as the operator instead inputs a variable value and the program advances to n13, where the CPU enters the variables value. The entered data is then stored in the RAM 24 and the flag corresponding to the variable is changed to 1 in order to set the value (n14). Next, the CPU 21 performs a calculating operation of all the membership values related to the corresponding variable i (n15). The CPU 21 then increases the variable counter by 1 (n16) and judges whether all variables values are input (n17). If all the variables values have not yet been set, then the program returns to n7 and the process is repeated until the CPU 21 finally determines that all the values have been set.

Once all the variables values have been set, the rule counter (r) is set to 1 (n18). Then, the sum of each rules output membership function, the correspondence maximum (CMAX), data is cleared to 0 (n19). When the CMAX data is cleared, the grade of the premises of rule r is calculated (n20). Then, the output membership function of rule r is calculated (n21). Next, the output membership functions of the rule r and the CMAX are synthesized (n22). The CPU 21 then judges whether all of the rule operation processing is completed (n23). If not, then the rule counter r is increased by 1 (n24) and the program returns to n20. If, on the other hand, all rule processing has been completed, the center of gravity of the CMAX data is calculated to produced e, a defuzzified result (n25). Finally, the defuzzified result e is displayed on the display window 2, the corresponding lamp 7, 8, or 9 is lit, and, according to the value of e, the buzzer may buzz (n26).

After the final determination, the program returns to n5 and waits for the next object or process to be evaluated. When all desired calculations have been made, the operator simply turns off the power switch 11 to end the process.

The above description and accompanying drawings are merely illustrative of the applications of the principles of the present invention and are not limiting. Many other embodiments falling under the spirit and scope of this invention may be devised by those skilled in the art. Accordingly, this invention is only limited by the scope of the appended claims.

What is claimed is:

1. A sensory inspection processor for evaluating an object in accordance with a plurality of variables which characterize said object, comprising:
   a keyboard for inputting evaluation values which characterize an inspected object;
   a card reader for reading fuzzy rules and membership functions stored on a card medium;
   a fuzzy reasoning means including a storing means for receiving and storing fuzzy rules membership functions read from a card medium, and a central processing unit for performing a fuzzy reasoning concerning said object using:
   (a) said read and stored fuzzy rules and membership functions and
   (b) said evaluation values input by said keyboard, said central processing unit outputting an evaluation representing the result of the fuzzy reasoning; and
   a display means for displaying said evaluation result from said fuzzy reasoning means.

2. A sensory inspection processor as in claim 1 further comprising a card medium connected to said card reader, said card medium having said fuzzy rules and membership functions stored thereon.

3. A sensory inspection processor according to claim 2, wherein said card medium comprises an integrated circuit card.

4. A sensory inspection processor according to claim 2, wherein said card medium comprises an optical card.

5. A sensory inspection processor according to claim 1, wherein said displaying means comprises a display window.

6. A sensory inspection processor according to claim 5, wherein said displaying means additionally comprises different colored lamps, wherein each lamp represents a specific determination and indicates said determination when lit.

7. A sensory inspection processor according to claim 6, wherein said displaying means additionally comprises a buzzer for indicating a determination of a poor score.

* * * * *